No. 657,988. Patented Sept. 18, 1900.
A. A. LAZIER.
VALVE FOR GAS ENGINES.
(Application filed Jan. 18, 1900.)
(No Model.) 2 Sheets—Sheet 1.
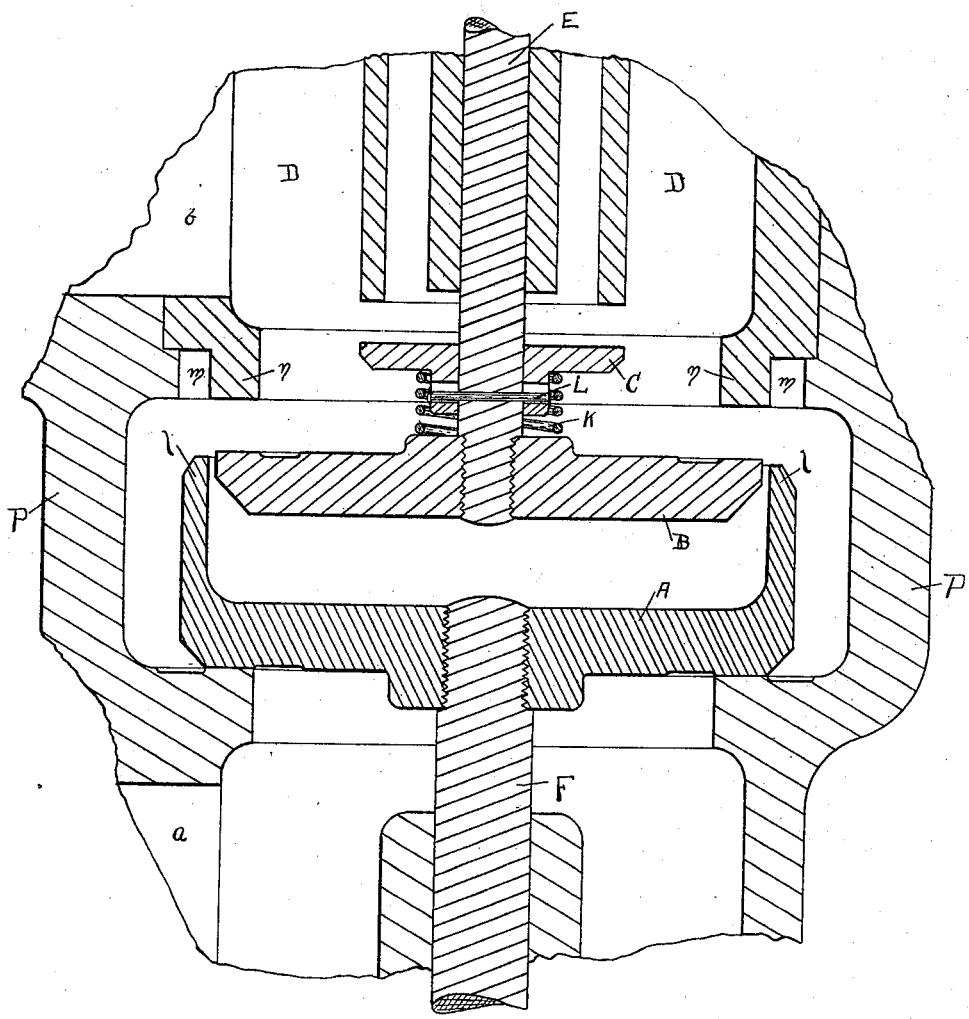
Fig. I.
Witnesses: Inventor:
Arthur A. Lazier
by his attorneys
Macomber Ellis No. 657,988. Patented Sept. 18, 1900.
A. A. LAZIER.
VALVE FOR GAS ENGINES.
(Application filed Jan. 18, 1900.)
(No Model.) 2 Sheets—Sheet 2.
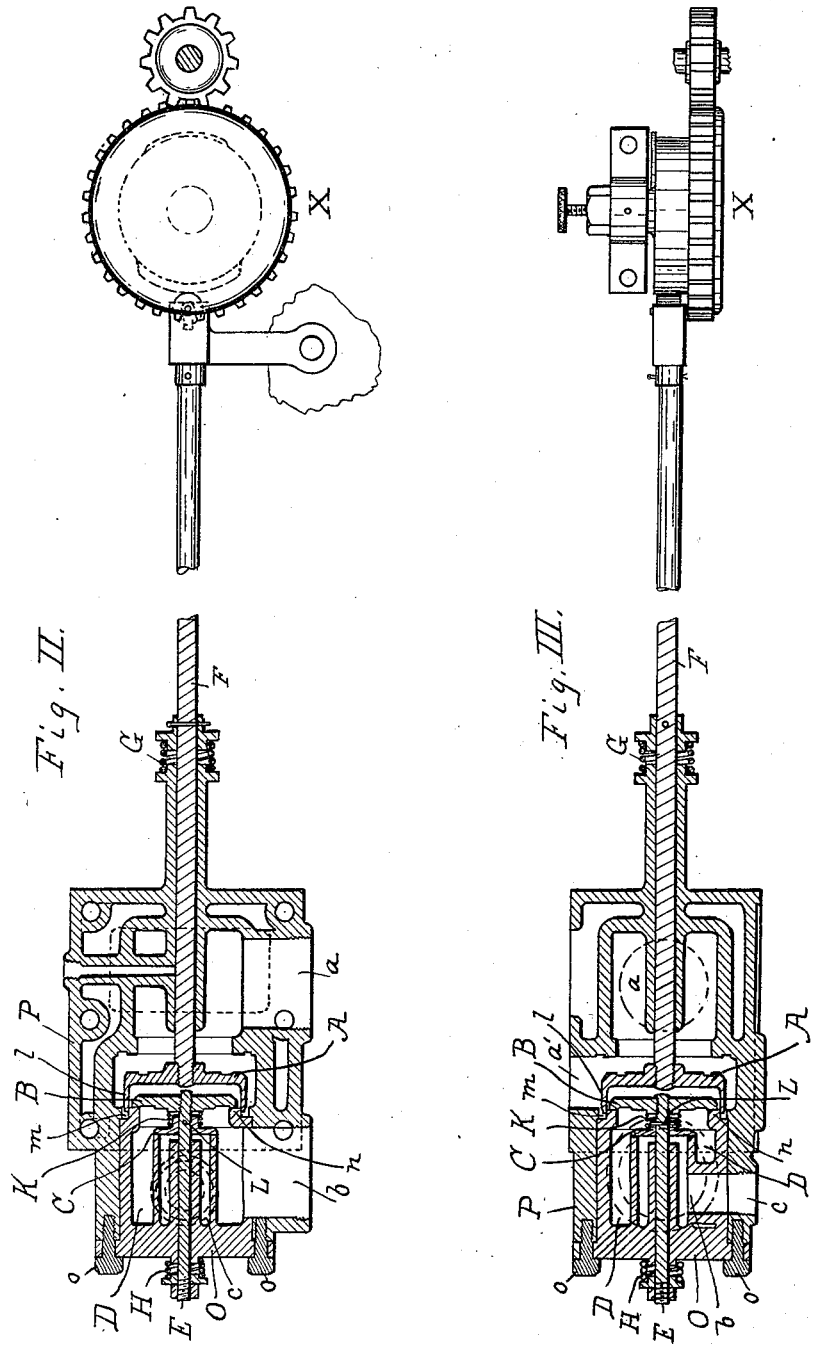
Witnesses:
Minnie McCarthy,
Edward C. Rischman.
Inventor:
Arthur A. Lazier,
by his Attorneys,
Macomber & Ellis

UNITED STATES PATENT OFFICE.

ARTHUR A. LAZIER, OF BUFFALO, NEW YORK.

VALVE FOR GAS-ENGINES.

SPECIFICATION forming part of Letters Patent No. 657,988, dated September 18, 1900.

Application filed January 18, 1900. Serial No. 1,876. (No model.)

*To all whom it may concern:*

Be it known that I, ARTHUR A. LAZIER, a citizen of the United States, residing at the city of Buffalo, in the county of Erie and State of New York, have invented certain new and useful Improvements in Valves for Gas-Engines, of which the following is a full, clear, and exact description.

My invention relates to that type of gas-engines operated upon the well-known "Otto" or four-cycle principle, in which a charge of gas and air is drawn into the cylinder upon the first outward stroke of the piston, compressed by the first inward stroke, ignited and exploded on the second outward stroke, and exhausted on the second inward stroke; and it more particularly relates to the exhaust, air, and fuel valves, which may be used upon any of the ordinary styles of such engines.

The object of my invention is to secure the maximum degree of efficiency of the engine and the prevention of leakage and loss of fuel.

The fly-wheels, cylinder, piston, and crankshaft being common features of gas-engines and having no connection with this invention have been omitted from the accompanying drawings.

Referring to the drawings herewith, consisting of two sheets, in which like letters refer to like parts, Figure I is a cross-sectional view of my exhaust, air, and fuel valves. Fig. II is a vertical cross-section of my exhaust, air, and fuel valves and a governing device. Fig. III is a horizontal cross-section of my exhaust, air, and fuel valves and a governing device.

A represents the exhaust-valve.

B represents the air-valve.

C represents the gas or fuel valve.

*a* represents the exhaust-outlet passage, which communicates with the cylinder through the port *a'*.

*b* represents the air-inlet passage, and *c* represents the gas or fuel inlet passage.

The mixed product of air and fuel pass into space D, which communicates with the cylinder through port *a'*. The air-valve B and the gas or fuel valve C are both attached to the stem E. The exhaust-valve A is attached to the stem F, which is connected with the governing device X, and the opening and closing of the exhaust-valve is controlled by the governing device. The exhaust-valve A is controlled in its motion by the spring G, which tends to keep it closed. The air-valve B and fuel-valve C are controlled in their motions by the spring H, which tends to keep them closed. The spring K is interposed between the valves B and C for the purpose of holding them yieldingly apart. In order to render the valves B and C capable of short independent movements with reference to each other, I have inserted a pin L, which is secured in the stem E and which projects in elongated openings in the surrounding hub of the fuel-valve C. By means of the pin L, together with the elongated openings of the hub of the valve C and the spring K, the fuel-valve C becomes seated before the air-valve B, the pin L giving to the gas-valve C sufficient lost motion to allow that valve the preference of seating itself before the air-valve B seats itself. Thus a waste or leakage of fuel, as well as secondary explosions or backfiring, are prevented. This same result may be accomplished by the use of a collar secured to the stem E or by other suitable and well-known mechanical devices.

The exhaust-valve A is a bell-shaped disk whose periphery (represented at *l*) when A is drawn from its seat passes into the annular space marked *m* and past the circular casting *n*, which forms a seat for the air-valve B, thus preventing the valves B and C from being drawn from their seats by the suction created by the piston in the cylinder when the engine is governing.

The fuel-valve C and air-valve B are mounted on the plug O, which is inserted in the valve-chest P and secured thereto by the screw-threaded bolts *o*. This plug is properly provided with ports which register with the fuel and air-inlets in the valve-chest. By the use of this plug construction I am enabled to withdraw the valves A, B, and C without disturbing the air and fuel and exhaust pipes which lead to the valve-chest.

Having thus described the several parts of my devices, I will now indicate their method of operation.

The exhaust-valve A being seated, the first outward stroke of the piston produces a suction, which, acting through the port *a'*, operates to open the air-valve B and the fuel-valve C, thus allowing the air and gas to mix in the proper proportions. The mixed product is then carried into the cylinder of the engine. When the piston reaches the end of its first outward stroke, the suction ceases, and the air and fuel valves B and C, respectively, are closed by the action of the spring H. The spring K, which tends to hold the valves B and C yieldingly apart, acts before the spring H acts, and on account of the short independent movement of the valve C, made possible by the pin L and the elongated openings in the hub of the valve C, the valve C seats itself before the valve B, and thus prevents any further entrance of fuel. The first inward stroke of the piston compresses the mixture. At the highest point of compression and just before the piston starts on its second outward stroke the charge is fired by electric ignition or otherwise. The piston then sweeps out on its second outward or power stroke, and at the end of this stroke the exhaust-valve A is opened by means of a valve-gear of any suitable governing device.

On the second inward stroke of the piston, the valve A being open, the burned gases are discharged through the port $a'$ and the exhaust-outlet passage $a$. Until the valve-gear releases the valve A it remains with its periphery $l$ in the space $m$, and thus prevents the suction produced by the piston in the cylinder when the engine is governing from drawing open the valves B and C, and thus wasting fuel.

Having thus described my improvements, what I claim is—

1. A gas-engine comprising a bell-shaped exhaust-valve having a stem, an air-valve, an air-valve seat around which the bell-shaped exhaust-valve is adapted to extend, a fuel-valve, a fuel-valve seat and a stem carrying the air-valve and fuel-valve.

2. A gas-engine comprising a valve-chest, a bell-shaped exhaust-valve having a stem extending through the valve-chest, a spring for closing the bell-shaped exhaust-valve, an air-valve, an air-valve seat around which the bell-shaped exhaust-valve is adapted to extend, a fuel-valve, a fuel-valve seat and a stem carrying the air-valve and fuel-valve.

3. A gas-engine comprising a bell-shaped exhaust-valve having a stem, an air-valve located within the bell-shaped exhaust-valve, an air-valve seat around which the bell-shaped exhaust-valve is adapted to extend, a fuel-valve, a fuel-valve seat and a stem carrying the air-valve and fuel-valve.

4. A gas-engine comprising a bell-shaped exhaust-valve having a stem, an air-valve, an air-valve seat around which the bell-shaped exhaust-valve is adapted to extend, a fuel-valve, a stem carrying the air-valve and fuel-valve, and a spring for keeping the air-valve and fuel-valve closed.

5. A gas-engine comprising a bell-shaped exhaust-valve having a stem, an air-valve, an air-valve seat around which the bell-shaped exhaust-valve is adapted to extend, a fuel-valve, a fuel-valve seat, a stem carrying the air-valve and fuel-valve, and a spring located between the air-valve and the fuel-valve holding them yieldingly apart and for opening the air-valve in advance of the fuel-valve and for closing the fuel-valve in advance of the air-valve.

6. A gas-engine comprising a bell-shaped exhaust-valve having a stem, an air-valve, an air-valve seat around which the bell-shaped exhaust-valve is adapted to extend, a fuel-valve having a hub formed with a transverse opening, a fuel-valve seat, a stem carrying the air-valve and fuel-valve, and having a transverse pin extending through a slot in the hub for limiting the movement of the fuel-valve and a spring extending on both sides of the transverse pin for opening the air-valve in advance of the fuel-valve and for closing the fuel-valve in advance of the air-valve.

7. A gas-engine comprising a valve-chest having an exhaust-outlet passage, a cylinder-port, an air-inlet passage, a fuel-inlet passage, and an air and fuel mixing space, a plug having ports, registering with the fuel-inlet passage and air-inlet passage of the valve-chest, an air-valve seat surrounded by an annular space, and a fuel-valve seat, a bell-shaped exhaust-valve adapted to extend into the annular space and having a stem and a controlling-spring, an air-valve, a fuel-valve, a stem carrying the air-valve and fuel-valve, a controlling-spring for closing the air-valve and fuel-valve and a yielding spring located between the air-valve and fuel-valve.

In witness whereof I have hereunto set my hand, this 6th day of January, 1900, in the presence of two witnesses.

ARTHUR A. LAZIER.

Witnesses:
A. W. PLUMLEY,
L. R. ROOT.